(12) United States Patent
Park

(10) Patent No.: US 12,373,764 B2
(45) Date of Patent: Jul. 29, 2025

(54) SYSTEM AND METHOD FOR DELIVERY PROCESSING FOR CROSS BORDER TRADING

(71) Applicant: COLOSSEUM CORPORATION, INC., Seoul (KR)

(72) Inventor: Jinsu Park, Seoul (KR)

(73) Assignee: COLOSSEUM CORPORATION, INC., Seoul (KR)

( * ) Notice: Subject to any disclaimer, the term of this patent is extended or adjusted under 35 U.S.C. 154(b) by 0 days.

(21) Appl. No.: 18/530,126

(22) Filed: Dec. 5, 2023

(65) Prior Publication Data

US 2025/0148405 A1 May 8, 2025

(30) Foreign Application Priority Data

Nov. 7, 2023 (KR) .................. 10-2023-0153118

(51) Int. Cl.
*G06Q 10/0831* (2023.01)
*G06Q 10/087* (2023.01)
(52) U.S. Cl.
CPC ....... *G06Q 10/0831* (2013.01); *G06Q 10/087* (2013.01)
(58) Field of Classification Search
CPC .................. G06Q 10/0831; G06Q 10/087
See application file for complete search history.

(56) References Cited

U.S. PATENT DOCUMENTS

2021/0090106 A1* 3/2021 Gu ................ G06Q 10/06315
2023/0186232 A1* 6/2023 Kim .................. G06Q 10/083
705/28

FOREIGN PATENT DOCUMENTS

KR    10-2018-0124299 A    11/2018

OTHER PUBLICATIONS

Nils Boysen, Optimizing automated sorting in warehouses: The minimum order spread sequencing problem, 2018, p. 386-388 (Year: 2018).*

* cited by examiner

*Primary Examiner* — Ibrahim N El-Bathy
(74) *Attorney, Agent, or Firm* — BROADVIEW IP LAW, PC

(57) ABSTRACT

A method and system for delivery processing for cross-border trading is provided. The method for delivery processing for cross-border trading according to an embodiment of the present disclosure may include checking state information of one or more bins to which one or more order information is mapped; generating a picking task for delivery products to be distributed into the one or more bins based on the state information; providing packing guidance information for distributing the delivery products to the one or more bins to a worker terminal after the delivery products are picked; and updating the state information of the one or more bins based on the delivery products being distributed into the one or more bins.

6 Claims, 16 Drawing Sheets

FIG. 6

SYSTEM AND METHOD FOR DELIVERY PROCESSING FOR CROSS BORDER TRADING

CROSS REFERENCE TO RELATED APPLICATION

The present application claims priority to Korean Patent Application 10-2023-0153118, filed Nov. 7, 2023, the entire contents of which is incorporated herein for all purposes by this reference.

BACKGROUND OF THE INVENTION

Field of the Invention

The present disclosure relates to a system and method for delivery processing for cross-border trading and, more particularly to, a system and method for delivery processing which are capable of processing cross-border trading in a non-stock manner.

Description of the Related Art

Cross-border trading (CBT) is to trade goods, services, and technologies across borders, and includes delivering products ordered by overseas customers via business-to-consumer (B2C) or business-to-business (B2B) through online and mobile phone means. Cross-border trading is a concept that includes both overseas direct purchase and reverse direct purchase markets, which is taking place in various industries.

Recently, as e-commerce has become active, the number of overseas consumers purchasing products directly online increases, and thus the demand for cross-border trading is also increasing. Accordingly, there is a need for a system for cross-border trading which makes it possible to reduce delivery costs and increase delivery efficiency.

SUMMARY OF THE INVENTION

An objective of the present disclosure is to provide a system and method for delivery processing for cross-border trading which makes it possible to reduce delivery costs and increase delivery efficiency in the overseas delivery of products.

Another objective of the present disclosure is to provide a system and method for delivery processing for cross-border trading which makes it possible to pack ordered products immediately without having to stock them and then shipping the packed ordered products overseas.

Another objective of the present disclosure is to provide a system and method for delivery processing for cross-border trading which makes it possible to efficiently manage bins for packing products and reduce delivery costs by increasing a turnover rate of the bins.

The technical objectives of the present disclosure are not limited thereto, and other technical objectives not mentioned will be clearly understood by those skilled in the art from the following description.

In order to achieve the above objectives, a method for delivery processing for cross-border trading according to embodiments of the present disclosure may include checking state information of one or more bins to which one or more order information is mapped; generating a picking task for delivery products to be distributed into the one or more bins based on the state information; providing packing guidance information for distributing the delivery products to the one or more bins to a worker terminal after the delivery products are picked; and updating the state information of the one or more bins based on the delivery products being distributed into the one or more bins.

In the exemplary embodiment, the method may further include one-to-one mapping the one or more order information with the one or more bins.

In the exemplary embodiment, the one-to-one mapping may include checking unmapped order information which is not mapped to the bin or unmapped bins which is not mapped to the order information; and one-to-one mapping the unmapped order information to the unmapped bins in the order of oldest reception time.

In the exemplary embodiment, the state information of the one or more bins may include a location, number, rack group, mapping information, delivery product information, or packing progress information of each bin placed on a rack in a warehouse center.

In the exemplary embodiment, providing the packing guidance information may include determining a worker movement path passing through the one or more bins; identifying a first bin into which a delivery product are to be distributed first among the one or more bins, on the basis of the worker movement path; and providing information on a location of the first bin or a first delivery product to be distributed into the first bin to the worker terminal as the packing guidance information.

In the exemplary embodiment, providing the packing guidance information may include providing a location of a second bin into which a delivery product is to be distributed, following the first bin, to the worker terminal as the packing guidance information, in response to a signal indicating that the first delivery product has been distributed into the first bin.

In the exemplary embodiment, updating the state information of the one or more bins may include updating packing progress information of the first bin in response to a signal indicating that the first delivery product has been distributed into the first bin.

In the exemplary embodiment, updating the state information of the one or more bins may include checking whether all delivery products of the first order information matched with the first bin have been distributed into the first bin based on the packing progress information of the first bin; and changing the first bin to a completed state when all the delivery products have been distributed into the first bin.

In the exemplary embodiment, the method may further include performing shipping processing for a bin in a completed state among the one or more bins; and changing the bin in the completed state to an unmapped state after performing the shipping processing for the bin in the completed state.

In the exemplary embodiment, the method may further include checking whether there is a third bin that is not in a completed state for more than a predetermined period of time among the one or more bins; creating an emptying operation to transfer a delivery product stored in the third bin to a temporary loading area; changing the third bin to an unmapped state when the delivery product stored in the third bin is transferred to the temporary loading area; and mapping unmapped order information to the third bin that has been changed to the unmapped state.

In order to achieve the above objectives, a system for delivery processing for cross-border trading according to embodiments of the present disclosure may include a processor; a memory loading a computer program executed by the processor; and storage storing the computer program, in which the computer program may include instructions for performing operations of: checking state information of one or more bins to which one or more order information is mapped; creating a picking task for delivery products to be distributed into the one or more bins based on the state information; providing packing guidance information for distributing the delivery products into the one or more bins to a worker terminal after the delivery products are picked; and updating state information of the one or more bins based on the delivery products being distributed into the one or more bins.

According to the embodiments of the present disclosure, a system for delivery processing for cross-border trading can be provided which is capable of reducing delivery costs and increasing delivery efficiency when shipping products overseas.

In addition, the efficiency of cross-border trading can be improved by allowing ordered products to be shipped overseas immediately without having to stock them. Furthermore, it is possible to respond flexibly not only to delivery processing of products of high variety and low volume, but also to delivery processing of products of low variety and high volume by allowing non-stock delivery and self-stock delivery to be integrally processed in one system.

In addition, overall delivery costs including warehouse costs can be reduced by efficiently managing bins for packing products and increasing a turnover rate of the bins.

The technical objectives of the present disclosure are not limited to the technical problems mentioned above, and other technical objectives not mentioned will be clearly understood by those skilled in the art from the description below.

BRIEF DESCRIPTION OF THE DRAWINGS

FIG. 6 is a diagram illustrating a user interface for checking and managing bin state information, according to an embodiment of the present disclosure.

DETAILED DESCRIPTION OF THE INVENTION

Hereinafter, embodiments of the present disclosure will be described in detail with reference to the accompanying drawings. The advantages and features of the present disclosure and methods for achieving them will become clear by referring to the embodiments described in detail below along with the accompanying drawings. However, the technical idea of the present disclosure is not limited to the following embodiments and may be implemented in various different forms. The following examples are intended to complete the technical idea of the present disclosure and provided to fully inform those skilled in the art of the present disclosure of the scope of the present disclosure, and the technical idea of the present disclosure is only defined by the scope of the claims.

When adding reference signs to components in each drawing, it should be noted that identical components have the same symbols as much as possible even if they are shown in different drawings. Additionally, when describing the present disclosure, when it is determined that a specific description of the related notice structure or function may obscure the gist of the present disclosure, the detailed description is omitted.

Unless otherwise defined, all terms (including technical and scientific terms) used in this specification may be used with meanings that can be commonly understood by those skilled in the art in the technical field to which the present disclosure pertains. Additionally, terms defined in commonly used dictionaries are not interpreted ideally or excessively, unless clearly specifically defined. The terminology used herein is for describing embodiments and is not intended to limit the invention. As used herein, singular forms also include plural forms, unless specifically stated otherwise in the context.

Additionally, when describing the components of the present disclosure, terms first, second, A, B, (a), and (b) may be used. These terms are only used to distinguish that component from other components; the term does not limit the nature, sequence, or order of the components in question. When a component is described as being "attached", "coupled", or "connected" to another component, it should be understood that the component may be directly coupled or connected to the other component, or intervening component may be present.

Figure 1:
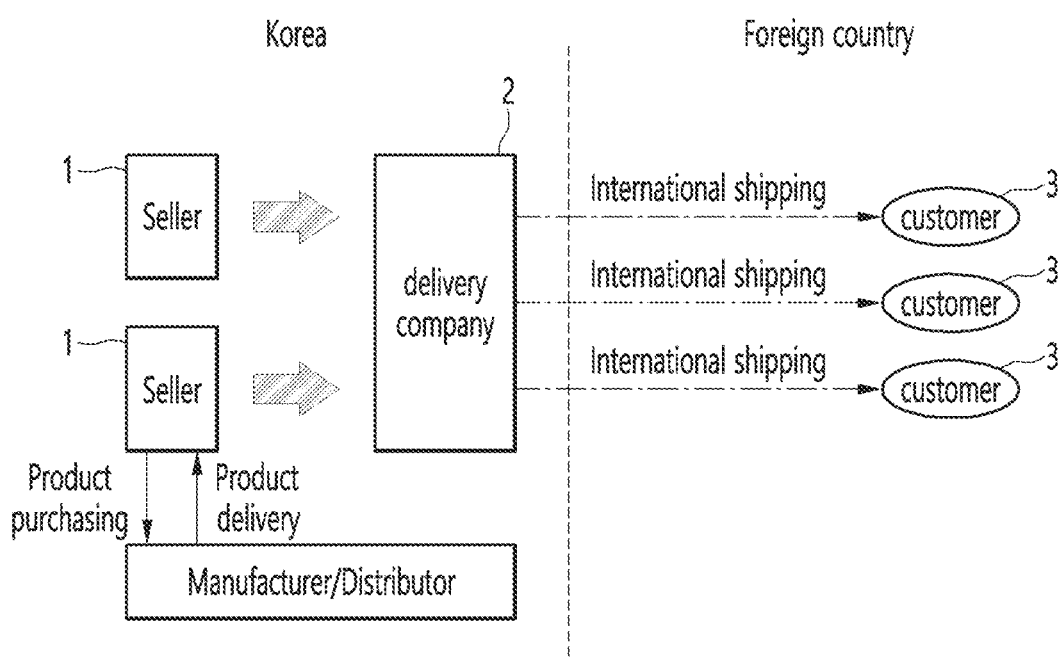
FIG. 1 is a diagram illustrating a method for typical cross-border trading in the related art.
Figure 2:
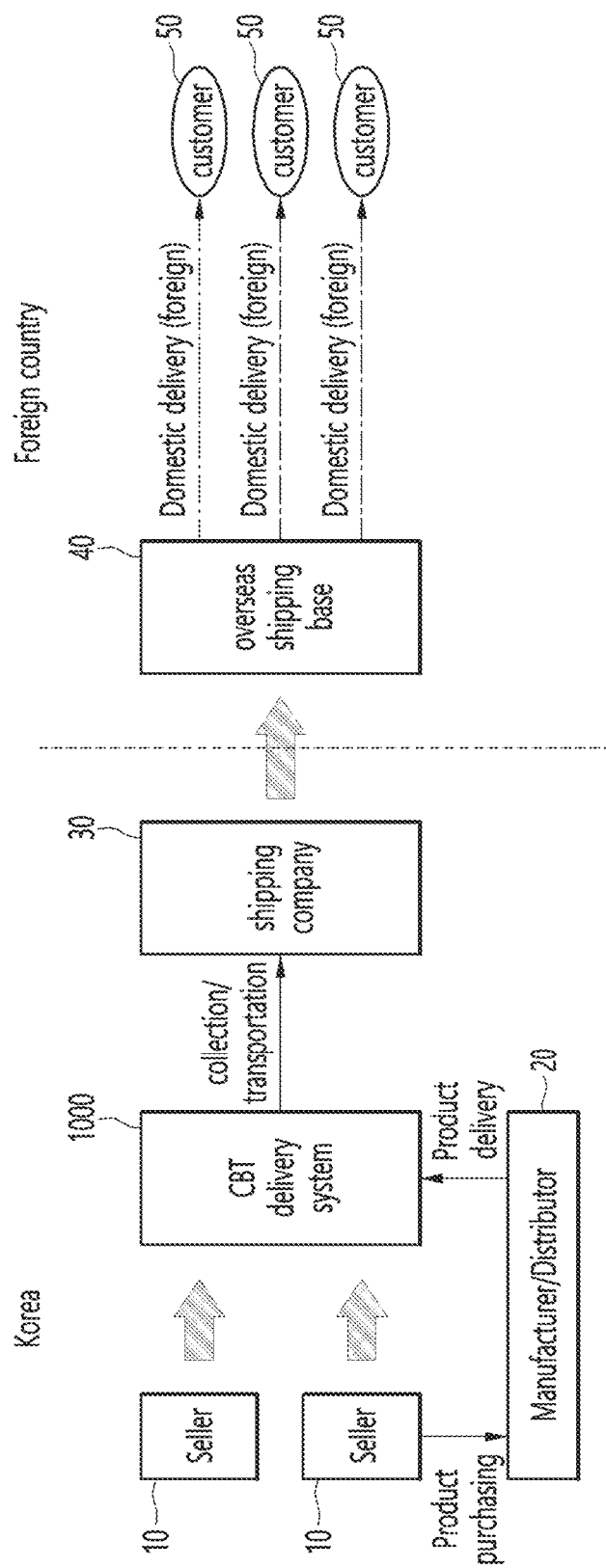
FIG. 2 is a diagram illustrating a method for cross-border trading, according to the present disclosure.

FIG. 1 is a diagram illustrating a typical method for cross-border trading in the related art, and FIG. 2 is a diagram illustrating a method for cross-border trading according to the present disclosure.

Referring to FIG. 1, the method for cross-border trading in the related art is configured so that, when an overseas customer 3 orders products from an online shopping mall, etc., a seller 1 purchases the products from a manufacturer or distributor and then allows a delivery company 2 to deliver the products to the overseas customer 3 via international shipping.

Herein, since products per order are shipped internationally, the international shipping costs are charged for each order, which results in the problem of significantly increasing overall shipping costs.

Referring to FIG. 2, the method for cross-border trading according to the present disclosure is configured so that, for each order that is requested by an overseas customer 50, products per order are packaged and collected through a CBT delivery system 1000, and then transported to a shipping company 30, and then transferred in a container to an overseas shipping base 40 through the shipping company 30, rather than internationally shipping the products per order, and in the overseas shipping base 40, the products are delivered to each customer 50 with a local waybill being attached per order.

Herein, since each order is collected and the ordered products are transferred in one container at a time, without processing international shipping per order event, which contributes to high costs, the overall shipping cost will be reduced and the efficiency of cross-border trading will increase.

Hereinafter, specific techniques for implementing this method for cross-border trading will be described through detailed examples.

Figure 3:
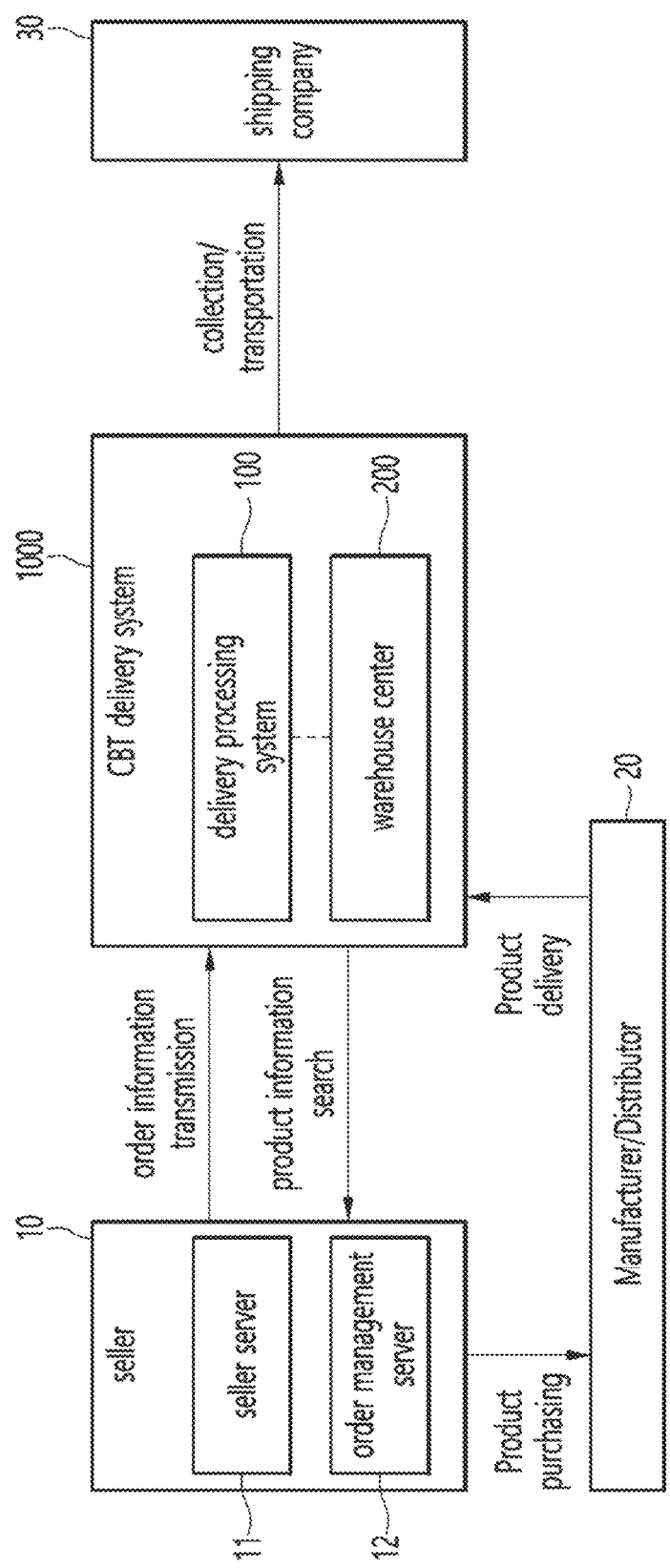
FIG. 3 is a block diagram illustrating a system for delivery processing for cross-border trading, according to an embodiment of the present disclosure.

FIG. 3 is a block diagram illustrating a system for delivery processing for cross-border trading, according to an embodiment of the present disclosure.

When a product order is received from an overseas customer through an online shopping mall, etc., a seller 10 may process order information through a seller server 11 and transmit the processed order information to the CBT delivery system 1000. Here, the seller server 11 may be an online shopping mall server or an individual seller's server linked to the online shopping mall.

According to an embodiment, the seller 10 may process the order information through a separate order management server 12. Herein, the order management server 12 may be an order information management server individually operated by the seller 10, or a server of a service provider (for example, CREATRIP) that provides a separate outsourcing service.

The CBT delivery system 1000 may store the transmitted order information, by searching detailed product information included in the order information through the seller server 11 or the order management server 12.

The seller 10 purchases the ordered products from the manufacturer or distributor 20 through the seller server 11 or the order management server 12, and then delivers the purchased products to a warehouse center 200 linked to the CBT delivery system 1000. Herein, the products may be purchased or delivered in a total quantity unit or bulk unit by combining multiple orders together, rather than individually being purchased or delivered per order event.

The products delivered to the warehouse center 200 are unloaded at the warehouse center 200, and then transferred to a picking zone for packaging per order event after registering the product information in the CBT delivery system 1000.

The delivery processing system 100 may create a picking task for delivery products to be distributed into each bin and transfer the picking task to the worker, based on the state information of the bins that is one-to-one mapped with each order event, and then the worker picks the delivery products from the picking zone according to the transferred picking task.

When the delivery product is picked, the delivery processing system 100 may create packing guidance information for distributing the delivery products to each bin and provide the packing guidance information to a worker terminal (not shown). The packing guidance information may include a name (number) of a bin into which the delivery products are to be distributed, the location of the bin, or types and quantities of the delivery products to be distributed.

Then, the worker distributes the picked delivery products into a bin mapped to the order information according to the packing guidance information, and accordingly the delivery processing system 100 may update the state information of the bin.

Here, 'bin' is a basket or box that temporarily stores the products of each order for packing, in which one bin may be one-to-one mapped with one order event.

In addition, 'distributing the delivery products to the bin' may mean that the delivery products with order information mapped to the bin are stored into the bin.

When there is a bin in which all the delivery products with matching the order information have been distributed (i.e. stored), among one or more bins, the delivery processing system 100 changes the bin to a completed state and performs shipping processing for the corresponding bin.

Here, the 'shipping processing' may mean emptying the bin by packaging the delivery products stored in the bin of the completed state per order event and then collecting them in a separate zone. The collected products are transported to the shipping company 30.

Thereafter, the delivery processing system 100 continues to perform delivery processing for subsequent orders by changing the bin that has completed shipping to an unmapped state, and mapping new other order event to the bin of the unmapped state.

According to an embodiment, the CBT delivery system 1000, the seller server 11, the order management server 12, and/or the worker terminal may be connected wired or wirelessly through a network.

Herein, for mutual communication using the network, the CBT delivery system 1000, the seller server 11, the order management server 12, and/or the worker terminal may transmit and receive data through Internet networks, LAN, WAN, public switched telephone network (PSTN), public switched data network (PSDN), cable TV network, WIFI, mobile communication network, and other wireless communication networks. In addition, the CBT delivery system 1000, the seller server 11, the order management server 12, and/or the worker terminal may include respective communication modules for communication using protocols corresponding to each communication network.

In addition, although the worker terminals described herein may include mobile phones, smart phones, laptop computers, digital broadcasting terminals, personal digital assistants (PDAs), portable multimedia players (PMPs), navigation, etc., the scope of the present disclosure is not limited thereto, and the worker terminal may include various devices capable of user input and information display, in addition to the devices mentioned above.

Meanwhile, various data transmission and reception between the CBT delivery system 1000, the seller server 11, the order management server 12, and/or the worker terminal (not shown) may be performed through applications installed on each device, or through data in email, short or long text message format, the application data, email, and data in the form of short or long text messages may be transmitted and received through a mobile communication network or a dedicated Internet network.

To this end, the CBT delivery system 1000 may be implemented as a server device that performs an overall role, such as communication protocol conversion, and functions from file server, collect server, push gateway server, transfer server, account server, admin server, reception server, conversion server, messaging server, push reception server, push sending server, etc.

In addition, the CBT delivery system 1000 may encrypt and manage all or part of the data with which the seller server 11, the order management server 12, and/or the worker terminal transmits and receives, as needed.

Figure 4:
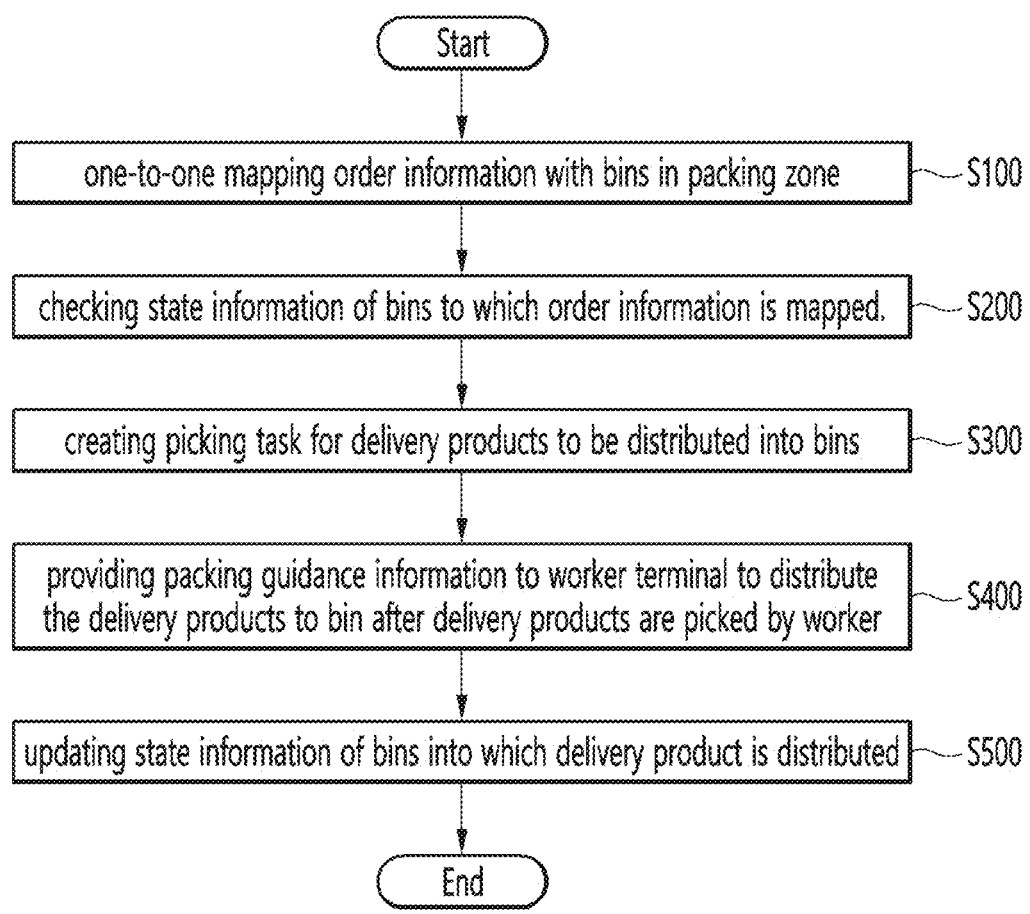
FIG. 4 is a flowchart illustrating a method for delivery processing for cross-border trading, according to an embodiment of the present disclosure.

FIG. 4 is a flowchart illustrating a method for delivery processing for cross-border trading, according to an embodiment of the present disclosure. The method for delivery processing for cross-border trading described in FIG. 4 may be performed by the system for delivery processing 100 of FIG. 3. Therefore, when the entity is omitted in the following steps, it is assumed that the entity is the delivery processing system 100. Hereinafter, a description will be made with reference to the drawings.

In step S100, one or more order information is one-to-one mapped with one or more bins in a packing zone.

Specifically, the delivery processing system 100 may check one or more bins in an unmapped state among bins in the packing zone, to allow one or more unmapped order information to be one-to-one mapped to the one or more bins.

According to an embodiment, the bin is a basket or box that temporarily stores the products for each order for packing, in which one bin may be one-to-one mapped with one order information.

According to an embodiment, the order information may include a delivery product name, delivery product quantity, delivery address, delivery recipient, delivery shipping company information, or delivery base information for each order event.

In step S200, state information of one or more bins to which one or more order information is mapped is checked.

According to an embodiment, the state information of the bin may include the location, number, rack group, mapping information, delivery product information, or packing progress information of each bin placed on a rack in a warehouse center.

Herein, the packing progress information indicates how the distribution of the current delivery product is progressed for each bin. For example, when first order information is mapped to the first bin, the first order information has two shampoos as delivery products, and the one shampoo is currently distributed into the first bin, the packing progress information of the first bin may consist of information indicating the progress of the distribution quantity compared to the delivery quantity, as referred to as shampoo (delivery quantity: 2, distribution quantity: 1).

At step S300, a picking task for delivery products to be distributed into one or more bins is created based on the checked state information.

Herein, the picking task may be created based on a total amount of delivery products to be distributed into one or more bins located in the picking zone.

For example, the one or more bins include a first bin, a second bin, and a third bin. When two shampoos will be to be distributed into the first bin, one shampoo to the second bin, and three shampoos to the third bin, the delivery processing system 100 may create a picking task to pick a total of six shampoos, based on the total amount of products to be distributed into the first to third bins.

When the created picking task is transmitted to the worker terminal, the worker may pick the total amount of delivery products to be distributed into one or more bins in the picking zone according to the picking task displayed on the worker terminal, to allow them to be transferred to the packing zone where the one or more bins are located.

At step S400, after the total quantity of the delivery products has been picked by the worker, the packing guidance information is provided to the worker terminal to distribute the delivery products to the one or more bins. The packing guidance information is to guide the worker on which delivery product to distribute into which bin. The packing guidance information may include, for example, the name (number) of the bin into which the delivery product will be distributed, the location of the bin, or the type and quantity of the delivery product to be distributed.

According to an embodiment, the packing guidance information may be sequentially provided for each bin based on the worker movement path within the packing zone.

For example, when the worker movement path passes through the first bin, the second bin, and the third bin sequentially, the packing guidance information may be sequentially provided for each bin, in such a manner that the packing guidance information is provided for the first bin located at the front of the worker movement path; the packing guidance information is provided for the second bin located after the first bin in the worker movement path when the worker completes distributing the delivery products to the first bin; and the packing guidance information is provided for the third bin located after the second bin in the worker movement path when the worker has distributed the delivery products into the second bin.

At step S500, the state information of one or more bins is updated based on the delivery product being distributed into one or more bins.

For example, when the packing progress information for the first bin is referred to as shampoo (delivery quantity: 2, distribution quantity: 1) before the delivery products are distributed, and the worker distributes one more shampoo to the first bin according to the packing guidance information, the packing progress information of the first bin may be updated with information referred to as shampoo (delivery quantity: 2, distribution quantity: 2).

Figure 5:
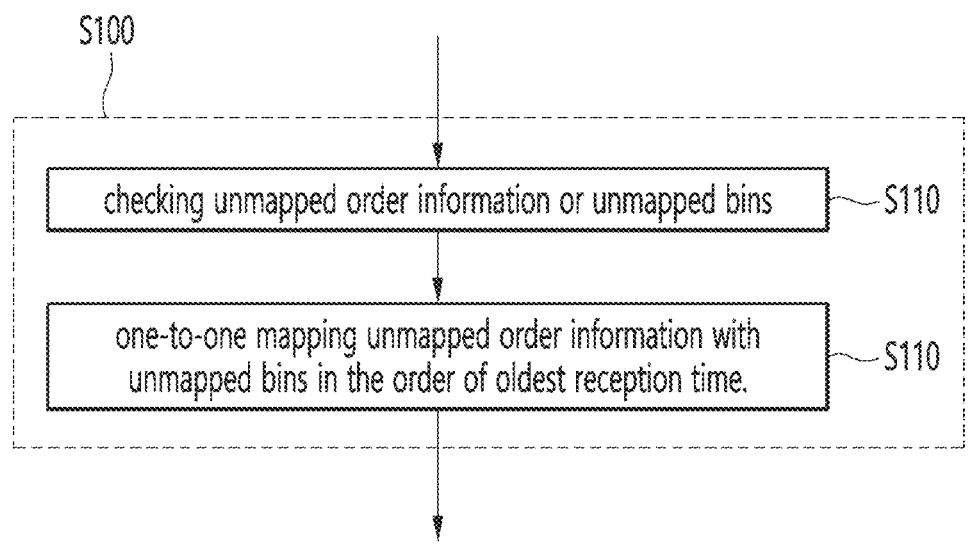
FIG. 5 is a flowchart illustrating an embodiment that further specifies the step S100 of FIG. 4.

FIG. 5 is a flowchart illustrating an embodiment that further specifies a step S100 of FIG. 4. FIG. 5 describes an embodiment in which the order information is one-to-one mapped to unmapped bins sequentially in the order of oldest reception time.

First, in step S110, unmapped order information that are not mapped to any bins, or unmapped bins that are not mapped to any order information are checked.

Then, in step S120, the unmapped order information is one-to-one mapped with the unmapped bins in the order of oldest reception time.

This allows certain orders to be prevented from remaining unprocessed for very long periods of time, by mapping bins preferentially from older orders that have not yet been processed, when mapping bins to orders.

Typically, as more bins are operated, warehouse costs increase. Therefore, to prevent warehouse costs from becoming too large, the delivery operators operate a limited number of bins, and as a result, the number of bins in operation is generally much smaller than the number of orders to be processed.

In this case, when an unmapped bin (i.e., an idle bin) is randomly mapped to each order to be processed, some orders may be left unmapped with bin being not mapped for relatively longer periods of time. When bad luck overlaps with probability, any bin may not be mapped to certain orders for very long periods of time, which may lead to long-term delivery delays.

Therefore, this embodiment allows certain orders to be prevented from being left unmapped for very long periods of time by mapping unmapped bins sequentially in the order of oldest receipt of order information when mapping the unmapped bins to the unmapped order information, in order to solve such problem of long-term delivery delays.

Figure 6:
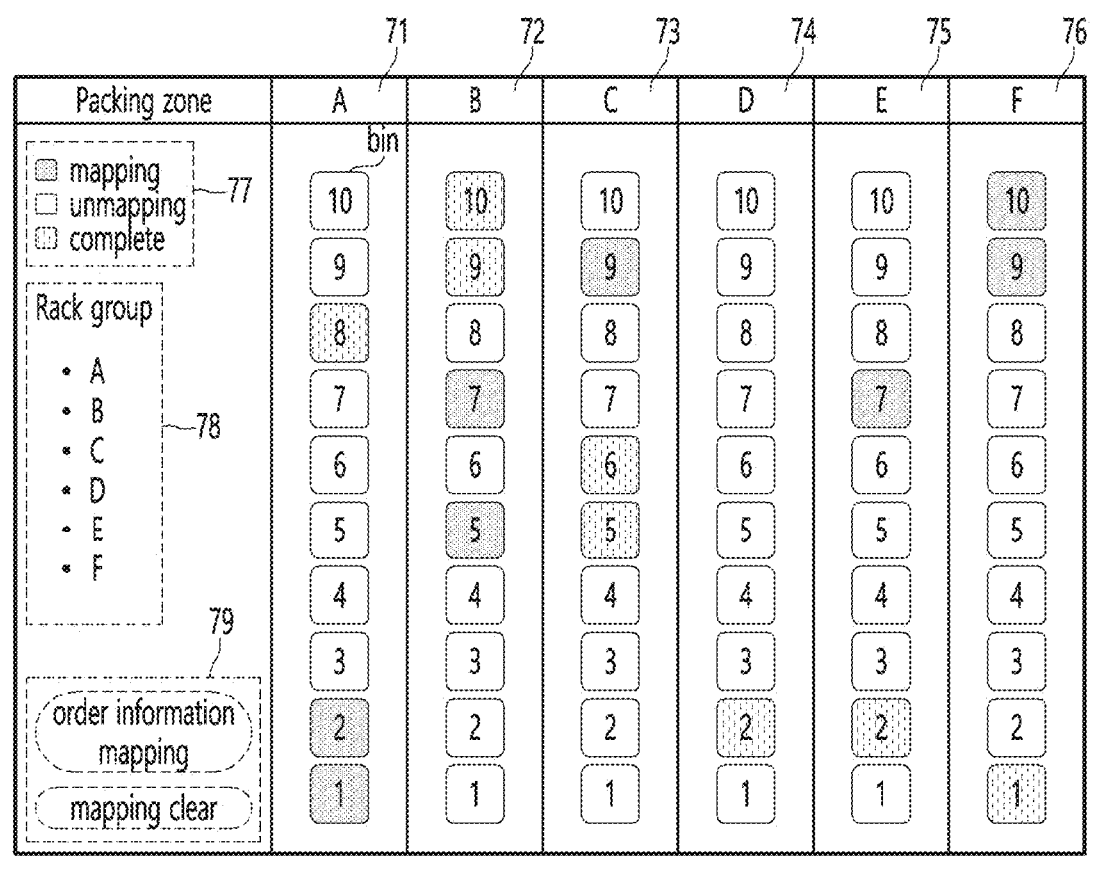

FIG. 6 is a diagram illustrating a user interface for checking and managing bin state information, according to an embodiment of the present disclosure.

Referring to FIG. 6, the user interface may include one or more rack groups 71, 72, 73, 74, 75, and 76, one or more bins belonging to each rack group 71, 72, 73, 74, 75, and 76, and mapping state information indicating whether each bin is mapped.

According to an embodiment, the mapping state indicating whether each bin is mapped may be displayed in color or pattern.

For example, as shown in a first region 77 of FIG. 6, assume that a mapping state is displayed in a first color, an unmapped state in a second color, and a completed state in a third color.

In this case, with regard to a rack group A 71, the first and second bins are in the mapped state, the third to seventh bins are in the unmapped state, the eighth bin is in the complete state, and the ninth and tenth bins are in the unmapped state, by allowing the first bin and the second bin to be displayed in the first color, the third to seventh bins to be displayed in a second color, the 8th bin to be displayed in the 3rd color, and the 9th and 10th bins to be displayed in a second color.

According to an embodiment, the user interface is provided with a second zone 78 on one side thereof to display a list of all rack groups 71, 72, 73, 74, 75, and 76.

According to an embodiment, an operation button 79 may be provided on one side of the user interface to manage the mapping state of each bin. For example, when the user selects an order information mapping button of the operation buttons 79, unmapped order information may be one-to-one mapped with unmapped bins of each rack group 71, 72, 73, 74, 75, and 76. Herein, as described above, the unmapped bins may be mapped sequentially from the order information with the oldest reception time, among the unmapped order information.

As another example, when the user selects a mapping clear button from the operation button 79, the mapping of the bin to order information may be cleared to allow the bin to be changed to an unmapped state. Herein, mapping clear function may be selectively performed only on some bins according to user selection. For example, when the user selects the mapping clear button after specifying the first bin of the rack group A 71, the mapping clear function is performed on only the first bin of the rack group A 71 to allow the first bin to be changed to an unmapped state and other bins to be remained mapped.

Figure 7:
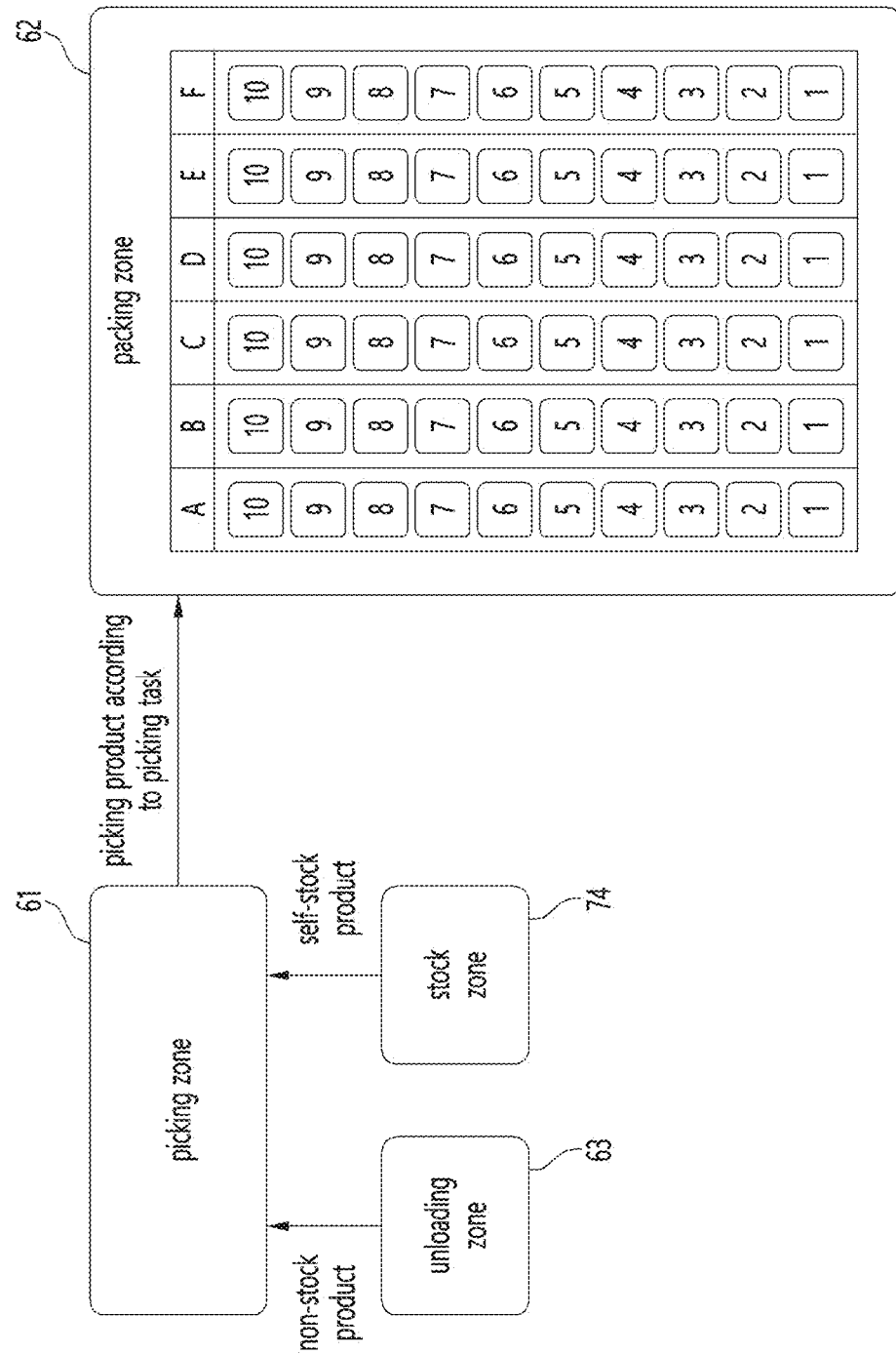
FIG. 7 is a diagram illustrating a method of picking a delivery product, according to an embodiment of the present disclosure.

FIG. 7 is a diagram illustrating a method of picking a delivery product, according to an embodiment of the present disclosure.

The delivery system in the related art is configured so that, products are stocked at the loading zone when the products are received, and the products are removed from the loading zone, packaged, and then delivered when delivering the products. This approach needs to consume a significant amount of manpower and time when stocking and shipping out products, and also requires a large loading zone to store stocking products, which result in increasing delivery costs.

This embodiment concerns a delivery system that solves such problems, and proposes approach of packaging and shipping products immediately without stocking them. This will be explained with reference to FIG. 7.

First, when the products are received, the products are unloaded in an unloading zone 63 and then transferred to the picking zone 61 for loading.

In addition, the delivery product and its delivery quantity to be distributed into bins in the packing zone are checked based on the state information of the bins in the packing zone 62. Then, a picking task is created according to the checked delivery product and delivery quantity, and the created picking task is transmitted to the worker terminal. Depending on the transmitted picking task, the worker may pick the total amount of required delivery products in the picking zone 61 to be distributed into each bin in the packing zone 62.

According to an example, when the quantity of the first delivery product loaded in the picking zone 61 is less than the delivery quantity of the first delivery product to be distributed into each bin in the packing zone 62, a bin with the most recent reception time of mapped order information may be preferentially excluded from distribution.

For example, let's assume that one first delivery product must be distributed into each of the first bin, the second bin, and the third bin of the bins of the packing zone 62, and order information reception time is in the following order: the first bin, the second bin, and the third bin. Herein, considering that the number of first delivery products loaded in the picking zone 61 is two, even though all of the first delivery products are picked in the picking zone 61, the distribution quantity may not be satisfied in the packing zone 62. In this case, in order to match the product quantity in the picking zone 61 with the distribution quantity in the packing zone 62, the third bin with the most recent reception time of the mapped order information may be excluded from distribution.

Meanwhile, according to an example, product delivery may be processed by combining the self-stock method with the non-stock method described above.

More specifically, an example will be described in which when a seller receives one or more first orders, the first order includes a first delivery product and a second delivery product as delivery products. Herein, let's assume that the first delivery product is a very popular product, so the seller secures a large amount of the product in advance and stores it in a stock zone 74, and the second delivery product is a product that is not in stock due to low sales volume.

In this case, since the second delivery product is a non-stock product that is not in stock, the product is unloaded at an unloading zone 63 and then immediately transferred to the picking zone 61 for loading. In addition, since the first delivery product is a self-stock product which is in stock by the seller, the total quantity required for the first order is picked from the stock zone 74 and then transferred to the picking zone 61 for loading. Since the first delivery product and the second delivery product loaded in the picking zone 61 are picked according to the picking operation, the products included in the first order are distributed into the mapped bins.

According to an embodiment, the delivery processing system 100 may classify the delivery products of the first order into a non-stock product and/or a self-stock product based on the seller information of the first order and the seller's inventory information.

For example, when the first order includes a first delivery product and a second delivery product, a seller of the first order is the first seller, and the first seller has both the first delivery product and the second delivery product as the self-stock product in the stock zone 74, the delivery processing system 100 may classify both the first delivery product and the second delivery product as the self-stock product. This is because both the first delivery product and the second delivery product are self-stock products which are in stock by the first seller, and thus there is no need for additional stocking in a non-stock method. Herein, the delivery processing system 100 picks the required quantity of the first delivery product and the second delivery product from the stock zone 74 and loads them into the picking zone 61.

Meanwhile, when the first order includes a first delivery product and a second delivery product, a seller of the first order is the first seller, and the first seller has only the first delivery product as its own stock product in the stock zone 74, the delivery processing system 100 may classify the first delivery product as the self-stock product and the second delivery product as the non-stock product. This is because the second delivery product is a product which is not in stock by the first seller, and thus has a need for additional stocking. Herein, the delivery processing system 100 is configured to pick the required quantity of the first delivery product from the stock zone 74 for loading it into the picking zone 61, wait for the second delivery product to arrive, unload the second delivery product at the unloading area 63 when the second delivery product is received, and immediately transfer it to the picking zone 61 for loading.

According to this embodiment, it is possible to minimize costs and inefficiencies arising from the stocking process by shipping the ordered products overseas immediately without stocking them. Furthermore, it is possible to respond flexibly not only to delivery processing of products of high variety and low volume, but also to delivery processing of products of low variety and high volume, by allowing the non-stock method and the self-stock method to be integrally processed in one system.

Figure 8:
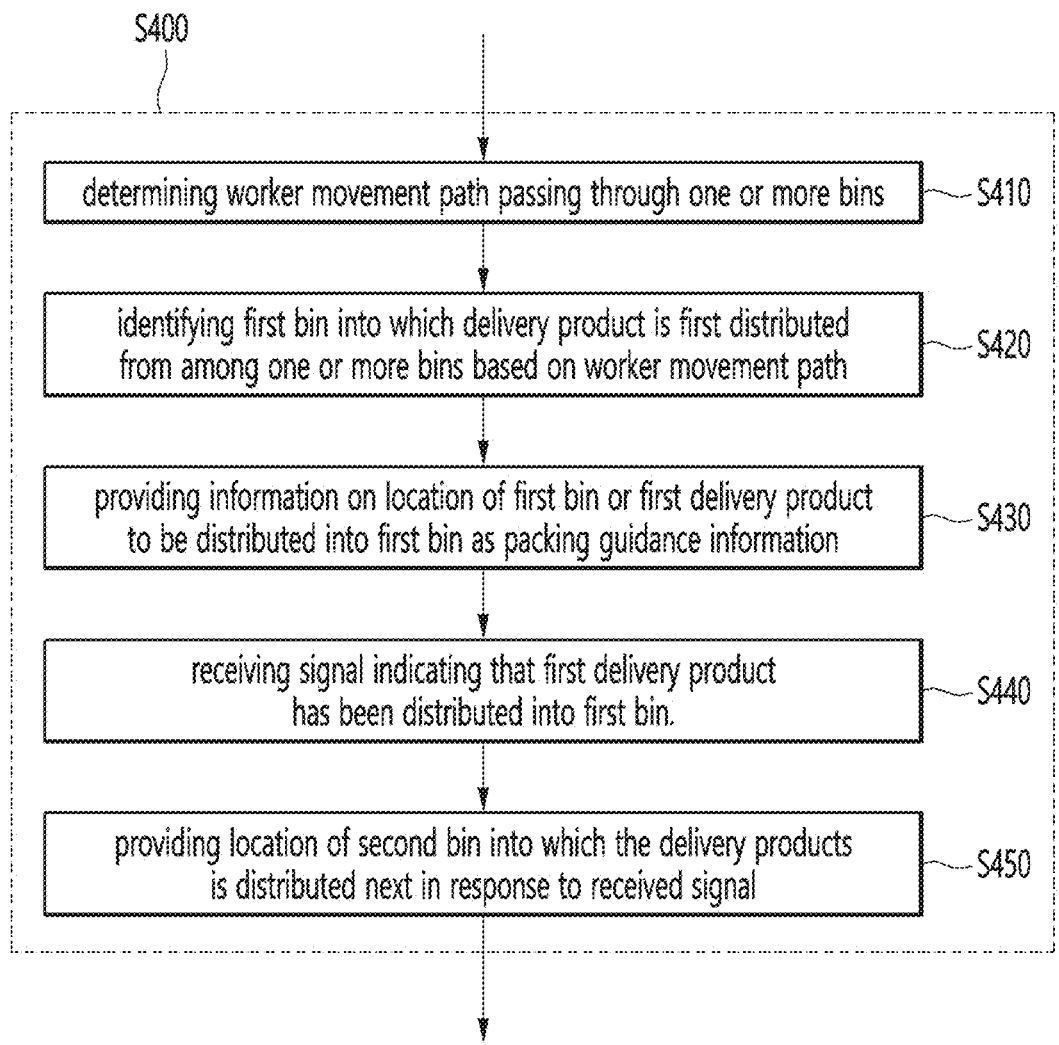
FIG. 8 is a flowchart illustrating an embodiment that further specifies the step S400 of FIG. 4.

FIG. 8 is a flowchart illustrating an embodiment that further specifies step S400 of FIG. 4. Referring to FIG. 8, a specific embodiment of generating and providing packing guidance information based on the worker movement path for distributing delivery products will be described.

In step S410, a worker movement path passing through one or more bins is determined.

According to an example, the shortest movement path may be determined from among one or more movement paths that pass through all bins at least once into which the delivery products are distributed, as the worker movement path.

In step S420, the first bin into which the delivery product is first distributed is identified from among one or more bins based on the worker movement path. For example, the first bin may be located closest to the starting point on the worker movement path.

In step S430, information on the location of the first bin or the first delivery product to be distributed into the first bin is provided to the worker terminal as the packing guidance information.

Figure 9:
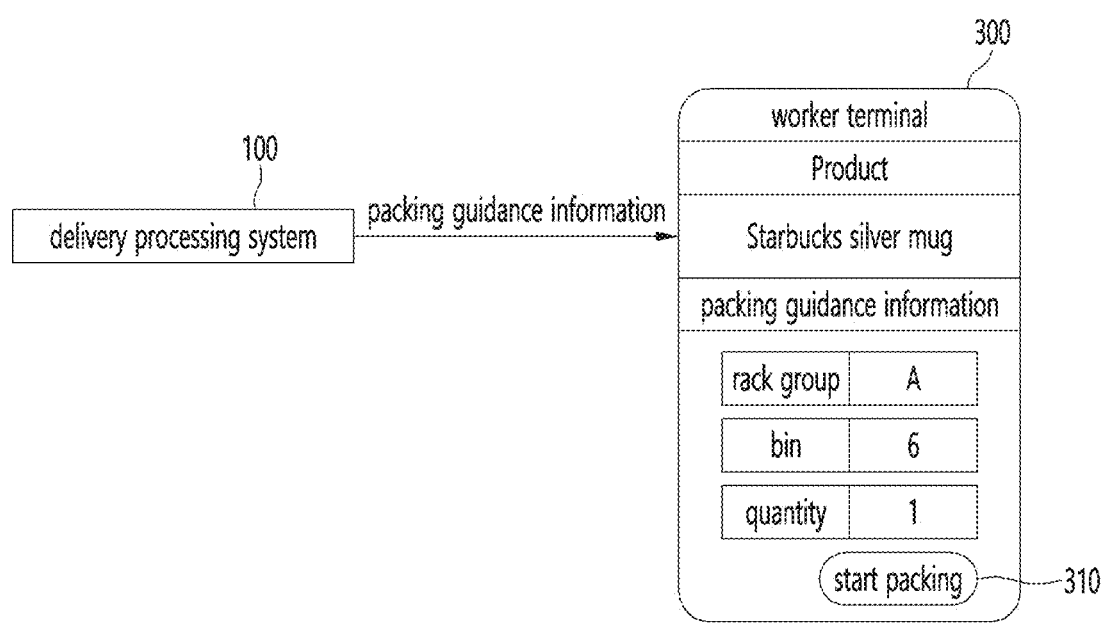
FIGS. 9 and 10 are drawings further illustrating the embodiment of FIG. 8.

This will be further described referring to FIG. 9. Referring to FIG. 9, an exemplary form of the packing guidance information provided by the delivery processing system 100 to the worker terminal 300 is shown.

In FIG. 9, the worker terminal 300 displays 'product name Starbucks silver mug' at the top of the terminal as the information on the first delivery product, and displays the location of the first bin into which the first delivery product is distributed (here, the 6th bin of rack group A) and the packing quantity (here, one) as the packing guidance information.

The worker will move to the sixth bin of the rack group A and distribute one Starbucks silver mug to the bin according to the packing guidance information displayed on the worker terminal 300.

According to an embodiment, the worker terminal 300 may further provide an additional user interface to assist the worker in distributing the delivery products. This additional user interface may be initiated by selecting a specific button, such as, for example, a packing start button 310 in FIG. 9. A specific example of an additional user interface is shown in FIG. 10.

Figure 10:
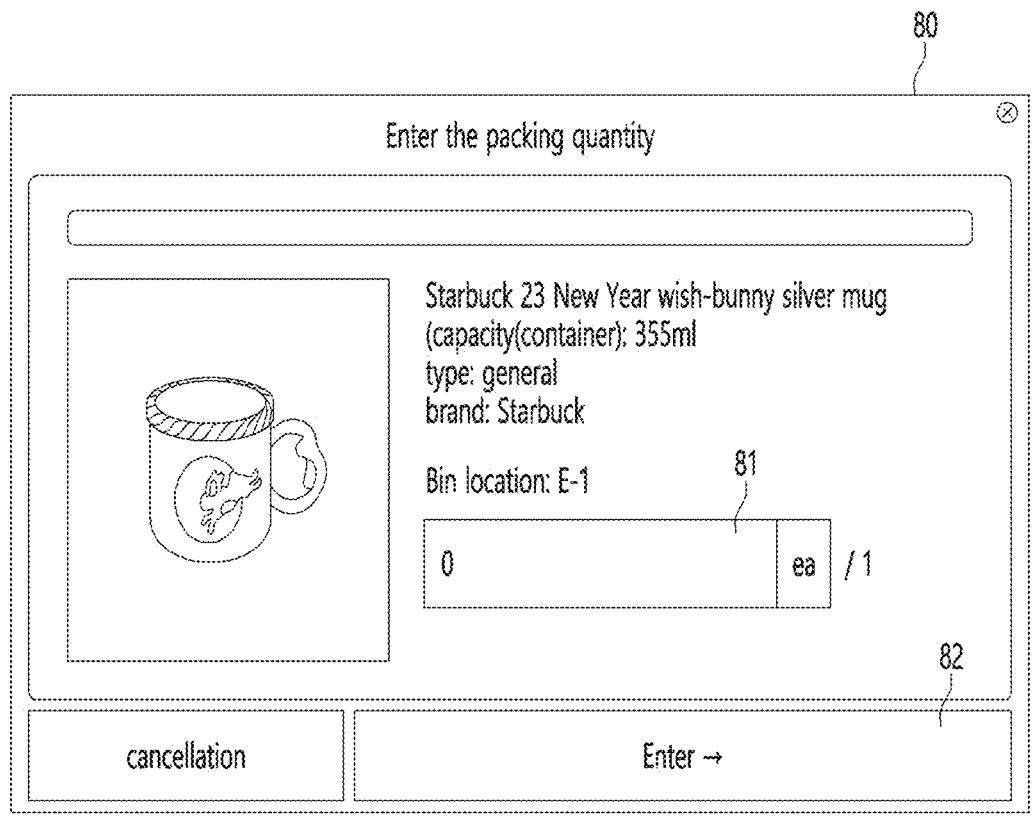

As shown in FIG. 10, an additional user interface 80 may display an image of the delivery product, a product name of the delivery product, a product code of the delivery product, a type of the delivery product, a manufacturer brand of the delivery product, and/or the location of the bin into which the delivery product is to be distributed.

In addition, the additional user interface 80 may further include functional elements 81 and 82 for checking that the delivery product has been distributed into the bin. For example, when the worker selects the first functional element 82, a barcode reader linked to the worker terminal is activated to recognize the barcode of the delivery product. Herein, when a quantity is entered into the first functional element 81, which is equal to the number of times when the barcode is recognized, and the quantity entered into the first functional element 81 is equal to the delivery quantity of the bin, a signal indicating that the delivery product has been distributed into the corresponding bin may be automatically transmitted to the delivery processing system 100.

Returning back to FIG. 8, in step S440, the signal indicating that the first delivery product has been distributed into the first bin is received.

As explained earlier, the signal may be automatically transmitted from the worker terminal 300 to the delivery processing system 100 to process check of distribution of the delivery products.

In step S450, in response to the received signal, the location of the second bin into which the delivery products is distributed, following the first bin, is provided to the worker terminal as the packing guidance information.

According to an embodiment, the second bin may be located next to the first bin in the worker movement path.

In this way, when the distribution of delivery products to all bins within the worker movement path is completed, the provision of packing guidance information also is completed.

Figure 11:
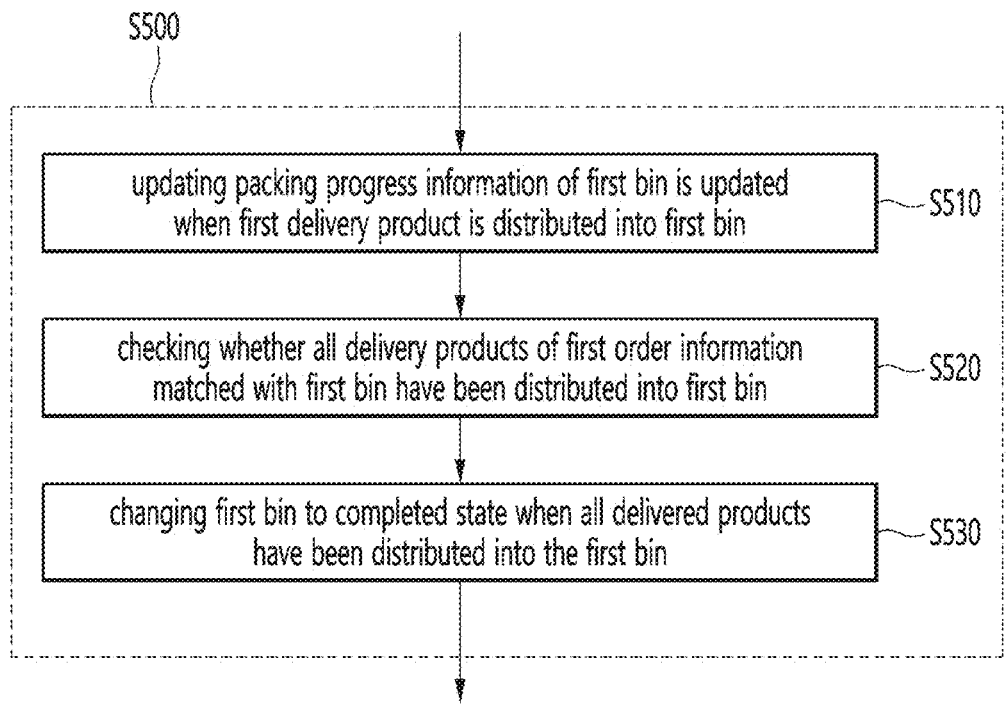
FIG. 11 is a flowchart illustrating an embodiment that further specifies the step S500 of FIG. 4.

FIG. 11 is a flowchart illustrating an embodiment that further specifies a step S500 of FIG. 4. In FIG. 11, an embodiment is described in which the packing progress information of the bin is updated according to the distribution of the delivery product, and the bin into which the delivery product has been distributed is processed.

First, in step S510, in response to a signal indicating that the first delivery product has been distributed into the first bin, packing progress information of the first bin is updated.

For example, when the existing packing progress information for the first bin is referred to as shampoo (delivery quantity: 2, distribution quantity: 1), and thereafter one additional shampoo is distributed into the first bin, the packing progress information of the first bin will be updated to be referred to as shampoo (delivery quantity: 2, distribution quantity: 2).

In step S520, it is checked whether all delivery products of the first order information matched with the first bin have been distributed into the first bin based on the updated packing progress information of the first bin. This may be performed by comparing the delivery quantity with the distribution quantity for each delivery product in the packing progress information of the first bin.

For example, when the delivery products included in the first order information are shampoo and nutritional supplements, and the updated packing progress information of the first bin is referred to as shampoo (delivery quantity: 2, distribution quantity: 2), and nutritional supplement (delivery quantity: 1, distribution quantity: 1), since the scheduled delivery quantity matches the quantity distributed into the first bin for all delivered products, it is checked that all delivery products of the first order information have been distributed into the first bin.

In step S530, when all delivered products have been distributed into the first bin, the first bin is changed to the completed state.

Thereafter, when the first bin which is changed to the completed state empties the stored products through shipping processing, the first bin changes to an unmapped state and then is assigned with new order information. This will be described in more detail later with reference to FIG. 12.

Figure 12:
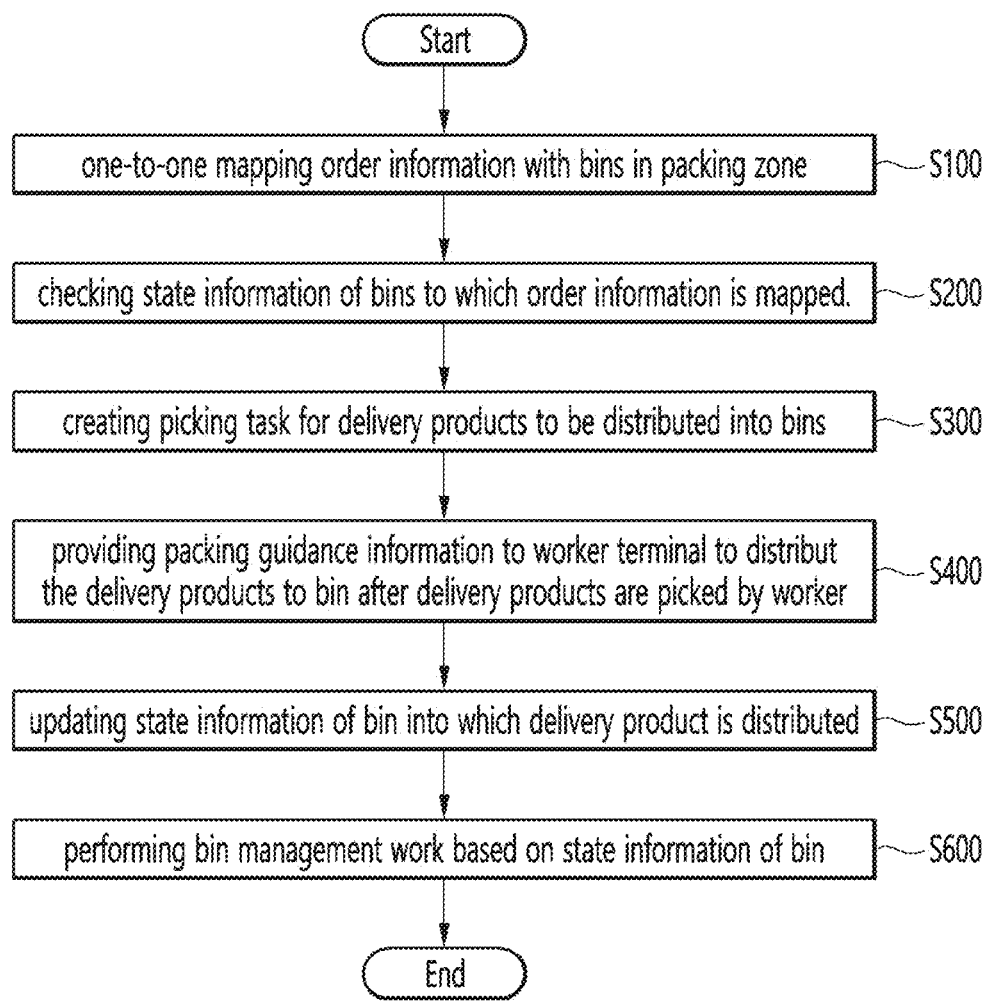
FIG. 12 is a flowchart illustrating a method for delivery processing for cross-border trading, according to another embodiment of the present disclosure.

FIG. 12 is a flowchart illustrating a method for delivery processing for cross-border trading, according to another embodiment of the present disclosure.

Steps S100 to S500 of the method for delivery processing of FIG. 12 are substantially the same as steps S100 to S500 described in FIG. 4. Therefore, to avoid redundant explanation, descriptions of steps S100 to S500 will be omitted here.

When the delivery product is distributed and accordingly the state information of the bin is updated, in step S100 to step S500, bin management work is performed based on the state information of the bin in step S600. This will be described in detail referring to FIGS. 13 to 15.

Figure 13:
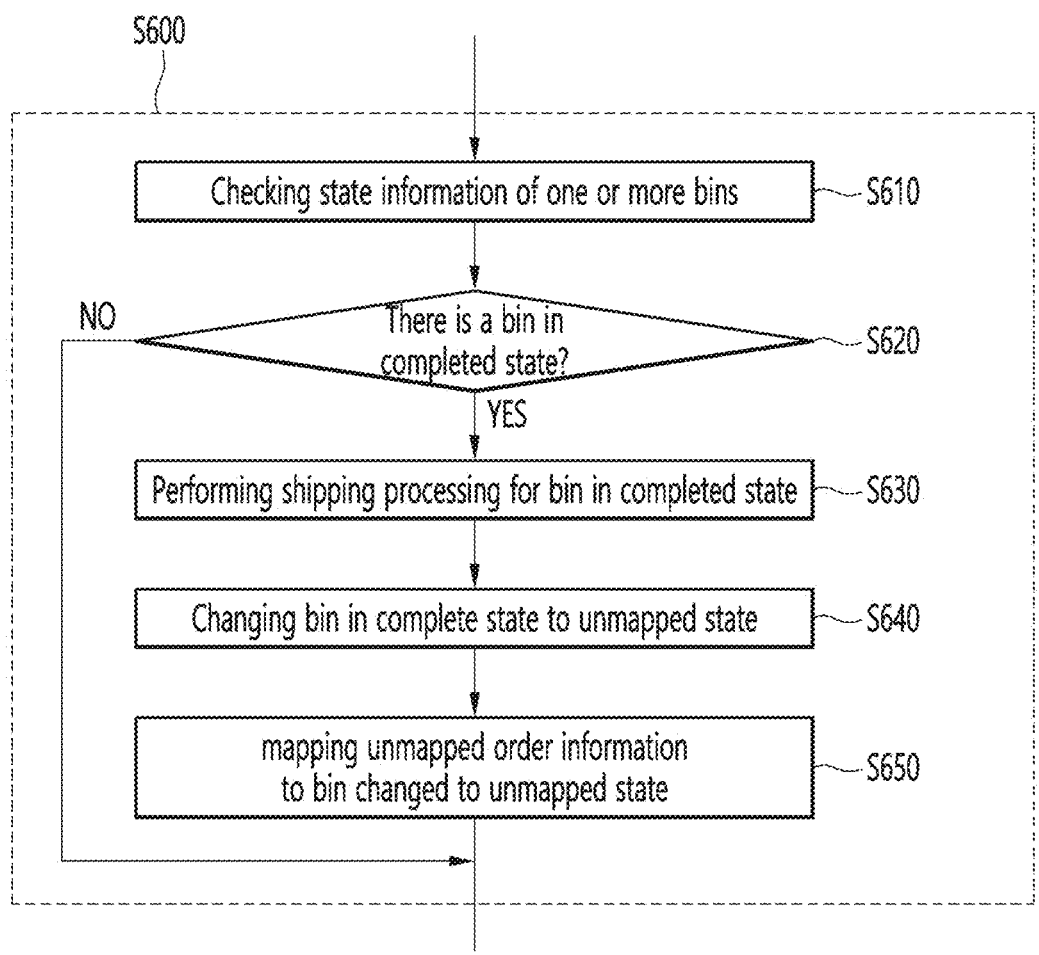
FIG. 13 is a flowchart illustrating an embodiment that further specifies the step S600 of FIG. 12.

FIG. 13 is a flowchart illustrating an embodiment that further specifies a step S600 of FIG. 12. In FIG. 13, an embodiment of performing shipping processing for the bin in the completed state and then mapping new order information to the bin will be described.

First, in step S610, the state information of one or more bins is checked.

In step S620, it is checked whether a bin in the completed state exists. When the bin in the completed state exists, the present embodiment proceeds to step S630. Otherwise, this embodiment ends.

In step S630, the shipping processing is performed for the bin in the completed state among one or more bins.

According to an embodiment, packaging the delivery products stored in the bin for which shipping processing is performed and then collecting them in a separate zone for each mapped order event may mean emptying the corresponding bin. The products collected in this way are transported to shipping companies and then transferred in a container to an overseas shipping base 40.

In step S640, when the shipping processing is performed for the bin in the complete state, i.e., the bin in the complete state is emptied, the bin changes to an unmapped state.

In step S650, unmapped order information is mapped to the bin that has been changed to an unmapped state.

According to an embodiment, when mapping unmapped order information to the bin, order information with the oldest reception time among a plurality of unmapped order information may be preferentially mapped to the bin.

Figure 14:
FIG. 14 is a diagram further illustrating the embodiment of FIG. 13.

FIG. 14 is a diagram further illustrating the embodiment of FIG. 13, and shows a user interface for performing shipping processing for the bin in the completed state.

Referring to FIG. 14, depending on user operation, a bin list 91 in the completed state may be displayed on the user interface of the delivery processing system 100. Herein, the bin list 91 in the completed state may be displayed separately on a per rack group basis.

According to an embodiment, when a user selects a bin included in the bin list 91, a screen 92 for performing shipping processing for the corresponding bin may be displayed. The user may check the product storage information of the bin displayed on the screen 92, and select the complete button 93 to instruct the shipping processing of the corresponding bin when there are no problems.

Figure 15:
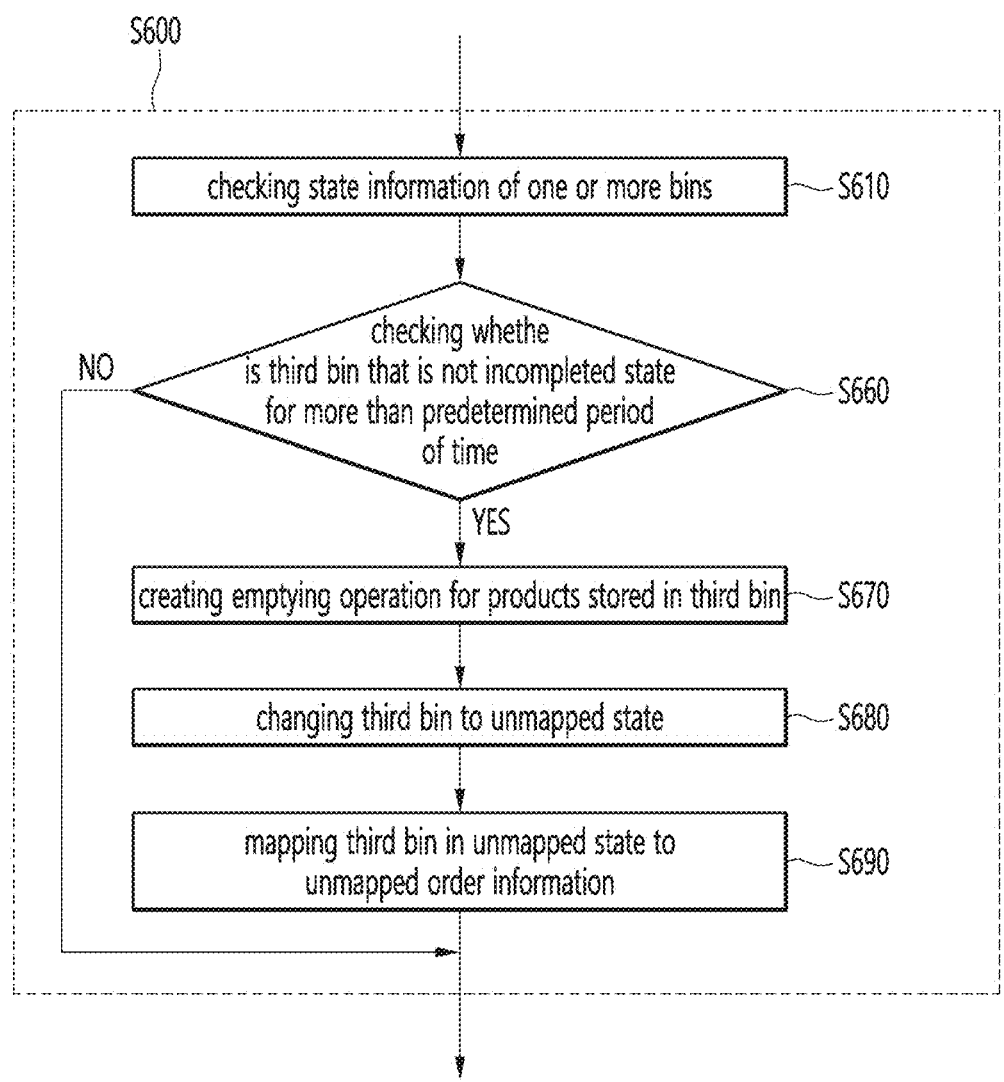
FIG. 15 is a flowchart illustrating another embodiment that further specifies the step S600 of FIG. 12.

FIG. 15 is a flowchart illustrating another embodiment that further specifies a step S600 of FIG. 12. Referring to FIG. 15, an embodiment is described in which a turnover rate of the bins is increased by temporarily performing mapping clear for orders that is not completed for long periods of time and utilizing the mapping cleared bin to process other order.

In step S610, the state information of one or more bins is checked. In this embodiment, step S610 is followed by step S660.

In step S660, it is checked whether there is a third bin that is not in the completed state for more than a predetermined period of time, among the one or more bins with checked state information. Herein, the predetermined period is a value initially set on the system or a value specified by the user, such as, for example, 1 week, 10 days, or 1 month.

Meanwhile, when there is the third bin that is not completed for more than the predetermined period of time, this embodiment proceeds to step S670. Otherwise, this embodiment ends.

In step S670, an emptying operation is created to transfer the delivery products stored in the third bin to the temporary loading zone. The created emptying operation is assigned to the worker, and the worker may make the third bin an empty state by transferring all delivered products stored in the 3rd bin into the temporary loading area according to the emptying operation.

In step S680, after the delivered products stored in the 3rd bin are transferred to the temporary loading area, the third bin changes to an unmapped state. This allows the third bin to be in a state capable of mapping, in order to remap new order information to the 3rd bin.

In step S690, the third bin that has been changed to an unmapped state is mapped with new unmapped order information. According to an embodiment, when mapping new unmapped order information to the third bin, order information with oldest reception time among a plurality of unmapped order information may be preferentially mapped to the third bin.

This embodiment is configured to prevent the third bin from being involved with unprocessed orders for long periods of time, in order to increase the utilization and turnover rate of the third bin by transferring the products stored in the third bin to the temporary loading zone to empty the third bin and then mapping other order information to the third bin, when the third bin is left incomplete for more than the predetermined period of time.

Typically, why orders that are not processed for long periods of time are often because some of the delivery products are out of stock or it takes time to receive them due to delivery issues. In this case, performing mapping clear for the bin mapped to the order and then using the bin to process other orders, rather than continuing to wait for the delivery product to arrive, is much more advantageous in terms of usability of bin.

In addition, the mapping-cleared order may be processed by remapping the unmapped bin to the order, only when it is checked that all delivery products are finally in stock by monitoring whether the delivery products are in stock.

According to the embodiments of the present disclosure described above, the system for delivery processing for cross-border trading can be provided which is capable of reducing delivery costs and increasing delivery efficiency when shipping products overseas. In addition, the efficiency of cross-border trading can be improved by allowing ordered products to be shipped overseas immediately without having to stock them. Furthermore, it is possible to respond flexibly not only to delivery processing of products of high variety and low volume, but also to delivery processing of products of low variety and high volume by allowing non-stock delivery and self-stock delivery to be integrally processed in one system. In addition, overall delivery costs including warehouse costs can be reduced by efficiently managing bins for packing products and increasing a turnover rate of the bins.

Hereinafter, an exemplary computing device 500 in which methods described in various embodiments of the present disclosure are implemented will be described with reference to FIG. 16. For example, the computing device 500 of FIG. 16 may be the delivery processing system 100 of FIG. 3.

Figure 16:
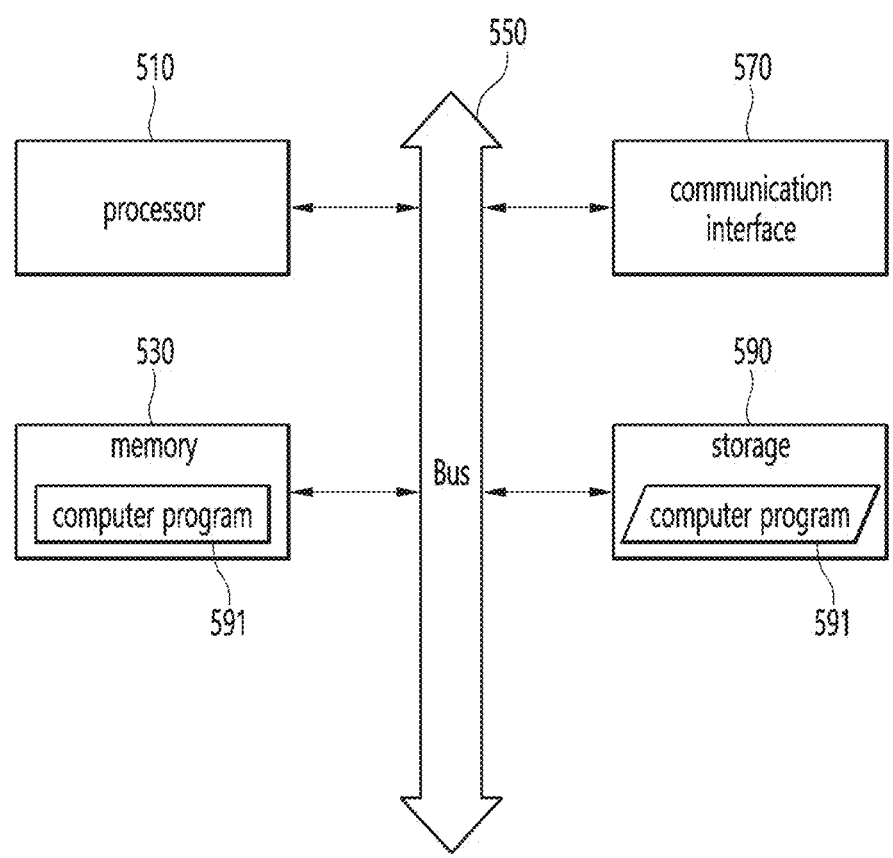
FIG. 16 is a block diagram illustrating the hardware configuration of a computing device used to implement various embodiments of the present disclosure.

FIG. 16 is an exemplary hardware configuration diagram illustrating the computing device 500.

As shown in FIG. 16, the computing device 500 may include one or more processors 510, a bus 550, a communication interface 570, a memory 530 for loading a computer program 591 executed by a processor 510, a storage 590 for storing computer programs 591. However, only components related to the embodiment of the present disclosure are shown in FIG. 16. Accordingly, those skilled in the art will appreciate that other general-purpose components other than those shown in FIG. 16 may be further included.

The processor 510 controls the overall operation of each component of the computing device 500. The processor 510 may be configured to include a central processing unit (CPU), micro-processor unit (MPU), micro-controller unit (MCU), and graphic processing unit (GPU), or at least one of any type of processor well known in the art. Additionally, the processor 510 may perform operations on at least one application or program to execute methods/operations according to various embodiments of the present disclosure. The computing device 500 may include one or more processors.

The memory 530 stores various data, commands and/or information. The memory 530 may load one or more programs 591 from the storage 590 to execute methods/operations according to various embodiments of the present disclosure. An example of the memory 530 may be RAM, but is not limited thereto.

The bus 550 provides communication functionality between components of computing device 500. The bus 550 may be implemented as various types of buses, such as an address bus, a data bus, and a control bus.

The communication interface 570 supports wired and wireless Internet communication of the computing device 500. The communication interface 570 may support various communication methods other than Internet communication. To this end, the communication interface 570 may be configured to include a communication module well known in the technical field of the present disclosure.

The storage 590 may store one or more computer programs 591 as non-transitory media. The storage 590 may be configured to include command memory such as read only memory (ROM), erasable programmable ROM (EPROM), electrically erasable programmable ROM (EEPROM), flash memory, a hard disk, a removable disk, or any form of computer-readable recording medium well known in the art to which the present disclosure pertains.

The computer program 591 may include one or more instructions to allow methods/operations according to various embodiments of the present disclosure to be implemented.

For example, the computer program 591 may include instructions for performing operations of: checking state information of one or more bins to which one or more order information is mapped; creating a picking task for delivery products to be distributed into the one or more bins based on the state information; providing packing guidance information for distributing the delivery product to the one or more bins to a worker terminal after the delivery product is picked; and updating state information of the one or more bins based on the delivery product being distributed into the one or more bins.

When the computer program 591 is loaded into the memory 530, the processor 510 may perform methods/operations according to various embodiments of the present disclosure by executing the one or more instructions.

The technical idea of the present disclosure described above may be implemented as computer-readable code on a computer-readable medium. The computer-readable recording medium may be, for example, a removable recording medium (CD, DVD, Blu-ray disk, USB storage device, removable hard disk), or a fixed recording medium (ROM, RAM, computer-equipped hard disk). The computer program recorded on the computer-readable recording medium may be transmitted to another computing device through a network such as the Internet and installed on the other computing device, thereby allowing it to be used in other computing devices.

Although embodiments of the present disclosure have been described above with reference to the attached drawings, those skilled in the art can appreciate that the present disclosure can be implemented in other specific forms without changing its technical idea or essential features. Therefore, the embodiments described above should be understood in all respects as illustrative and not restrictive. The scope of protection of the present disclosure should be interpreted in accordance with the claims below, and all technical ideas within the equivalent scope should be construed as being included in the scope of the technical ideas defined by the present disclosure.

What is claimed is:

1. A method for delivery processing for cross-border trading, which is performed by a computing device, the method comprising:
    checking state information of one or more bins to which one or more order information is mapped;
    generating a picking task for delivery products to be distributed into the one or more bins based on the state information;
    providing packing guidance information for distributing the delivery products to the one or more bins to a worker terminal; and
    updating the state information of the one or more bins based on the delivery products being distributed into the one or more bins;

one-to-one mapping the one or more order information with the one or more bins by:
  checking unmapped order information which is not mapped to the one or more bins or unmapped bins which is not mapped to the order information; and
  one-to-one mapping the unmapped order information to the unmapped bins in the order of oldest reception time;
wherein providing the packing guidance information comprises:
  determining a worker movement path passing through the one or more bins, the worker movement path is a shortest movement path from one or more movement paths that passes thru all bins into which delivery products are to be distributed;
  identifying a first bin into which a delivery product are to be distributed first among the one or more bins, on the basis of the worker movement path; and
  providing information on a location of the first bin or a first delivery product to be distributed into the first bin to the worker terminal as the packing guidance information;
  automatically transmit a signal from the worker terminal to the computing device to indicate that the first delivery product has been distributed into the first bin based on a determination that a delivery quantity of the first bin is equal to a number of times a barcode of the first delivery product is recognized by a barcode reader linked to the worker terminal;
  in response to the automatically transmitted signal from the worker terminal indicating that the first delivery product has been distributed into the first bin, automatically determining a second bin located after the first bin in the one or more bins based on the worker movement path;
  automatically providing a location of the second bin into which a delivery product is to be distributed, following the first bin, to the worker terminal as the packing guidance information, in response to the automatically transmitted signal indicating that the first delivery product has been distributed into the first bin;
wherein updating the state information of the one or more bins comprises:
  updating packing progress information of the first bin in response to the signal indicating that the first delivery product has been distributed into the first bin.

2. The method of claim 1, wherein the state information of the one or more bins includes a location, number, rack group, mapping information, delivery product information, or packing progress information of each bin placed on a rack in a warehouse center.

3. The method of claim 1, wherein updating the state information of the one or more bins comprises:
  checking whether all delivery products of the order information matched with the first bin have been distributed into the first bin based on the packing progress information of the first bin; and
  changing the first bin to a completed state when all the delivery products have been distributed into the first bin.

4. The method of claim 1, further comprising:
performing shipping processing for a bin in a completed state among the one or more bins; and
changing the bin in the completed state to an unmapped state after performing the shipping processing for the bin in the completed state.

5. The method of claim 1, further comprising:
checking whether there is a third bin that is not in a completed state for more than a predetermined period of time among the one or more bins;
creating an emptying operation to transfer a delivery product stored in the third bin to a temporary loading area;
changing the third bin to an unmapped state when the delivery product stored in the third bin is transferred to the temporary loading area; and
mapping unmapped order information to the third bin that has been changed to the unmapped state.

6. A system for delivery processing for cross-border trading comprising:
a processor;
a memory loading a computer program executed by the processor; and
storage storing the computer program, the computer program including instructions for performing operations of:
checking state information of one or more bins to which one or more order information is mapped;
creating a picking task for delivery products to be distributed into the one or more bins based on the state information;
providing packing guidance information for distributing the delivery products into the one or more bins to a worker terminal after the delivery products are picked; and
updating the state information of the one or more bins based on the delivery products being distributed into the one or more bins;
one-to-one mapping the one or more order information with the one or more bins by:
  checking unmapped order information which is not mapped to the one or more bins or unmapped bins which is not mapped to the order information; and
  one-to-one mapping the unmapped order information to the unmapped bins in the order of oldest reception time;
wherein providing the packing guidance information comprises:
  determining a worker movement path passing through the one or more bins, the worker movement path is a shortest movement path from one or more movement paths that passes thru all bins into which delivery products are to be distributed;
  identifying a first bin into which a delivery product are to be distributed first among the one or more bins, on the basis of the worker movement path; and
  providing information on a location of the first bin or a first delivery product to be distributed into the first bin to the worker terminal as the packing guidance information;
  automatically transmit a signal from the worker terminal to the system to indicate that the first delivery product has been distributed into the first bin based on a determination that a delivery quantity of the first bin is equal to a number of times a barcode of the first delivery product is recognized by a barcode reader linked to the worker terminal;
  in response to the signal from the worker terminal indicating that the first delivery product has been distributed into the first bin, automatically determining a second bin located after the first bin in the one or more bins based on the worker movement bin;

automatically providing a location of the second bin into which a delivery product is to be distributed, following the first bin, to the worker terminal as the packing guidance information, in response to the automatically transmitted signal indicating that the first delivery product has been distributed into the first bin;

wherein updating the state information of the one or more bins comprises:

updating packing progress information of the first bin in response to the signal indicating that the first delivery product has been distributed into the first bin.

* * * * *